United States Patent
Page et al.

(10) Patent No.: US 10,402,879 B2
(45) Date of Patent: Sep. 3, 2019

(54) OFFERING A CUSTOMIZED COLLECTION OF PRODUCTS

(75) Inventors: Alison Page, Nürnberg (DE); Lawrence Max Motola, Nürnberg (DE); Charlotta Nordin, Erlangen (DE); Andreas Albert Perez Alba, Fürth (DE)

(73) Assignee: adidas AG, Herzogenaurach (DE)

( * ) Notice: Subject to any disclaimer, the term of this patent is extended or adjusted under 35 U.S.C. 154(b) by 1145 days.

(21) Appl. No.: 13/340,919

(22) Filed: Dec. 30, 2011

(65) Prior Publication Data

US 2013/0173414 A1    Jul. 4, 2013

(51) Int. Cl.
 *G06Q 30/00*  (2012.01)
 *G06Q 30/06*  (2012.01)

(52) U.S. Cl.
 CPC ..... *G06Q 30/0621* (2013.01); *G06Q 30/0643* (2013.01)

(58) Field of Classification Search
 CPC . G06Q 30/06; G06Q 30/0621; G06Q 30/0643
 USPC ..................... 705/26.1, 26.5, 27.2
 See application file for complete search history.

(56) References Cited

U.S. PATENT DOCUMENTS

| | | | |
|---|---|---|---|
| 4,745,290 A | 5/1988 | Frankel et al. | |
| 5,561,932 A | 10/1996 | Bracken | |
| 6,026,376 A | 2/2000 | Kenney | |
| 6,084,581 A * | 7/2000 | Hunt | 715/202 |
| 6,240,251 B1 * | 5/2001 | Smart et al. | 396/6 |
| 6,381,583 B1 | 4/2002 | Kenney | |
| 6,504,571 B1 | 1/2003 | Narayanaswami et al. | |
| 6,885,998 B1 | 4/2005 | Arduino | |
| 7,249,067 B2 | 7/2007 | Doerksen et al. | |
| 7,395,220 B2 | 7/2008 | Abrams et al. | |
| 7,461,012 B2 | 12/2008 | Elberbaum et al. | |
| 7,685,234 B2 | 3/2010 | Gottfried | |
| 7,801,763 B2 | 9/2010 | Sidlo et al. | |
| 7,809,601 B2 | 10/2010 | Shaya et al. | |
| 7,836,050 B2 | 11/2010 | Jing et al. | |
| 7,933,955 B2 | 4/2011 | Khalatian | |

(Continued)

FOREIGN PATENT DOCUMENTS

| | | |
|---|---|---|
| DE | 102007057969 | 6/2009 |
| DE | 102009018506 | 10/2010 |

(Continued)

OTHER PUBLICATIONS

"MyLocker.net" web site pages published on May 2, May 24 and Aug. 16, 2007 extracted from wayback machine web site web.archive.org on Aug. 12, 2014.*

(Continued)

*Primary Examiner* — Yogesh C Garg
(74) *Attorney, Agent, or Firm* — Kilpatrick Townsend & Stockton LLP

(57) ABSTRACT

Systems, apparatuses, and methods are provided for customizing collections of products. A first user selects a subset of products for customization, and subsequently causes those products to be customized. The first user may place limitations on further customization of the subset of products. A second user associated with the customized products further customizes those products. The further customization may be restricted by the limitations imposed by the first user.

12 Claims, 9 Drawing Sheets

(56) References Cited

U.S. PATENT DOCUMENTS

| | | |
|---|---|---|
| 8,538,973 B1 | 9/2013 | Gonzalez et al. |
| 2003/0027121 A1* | 2/2003 | Grudnitski et al. .......... 434/308 |
| 2003/0074253 A1 | 4/2003 | Scheuring et al. |
| 2003/0078859 A1 | 4/2003 | Coke et al. |
| 2004/0010522 A1* | 1/2004 | Shulok .................. 707/201 |
| 2004/0133542 A1 | 7/2004 | Doerksen et al. |
| 2005/0044025 A1* | 2/2005 | Tutty et al. ................ 705/35 |
| 2005/0177453 A1 | 8/2005 | Anton et al. |
| 2005/0289018 A1* | 12/2005 | Sullivan et al. ............ 705/27 |
| 2006/0111976 A1 | 5/2006 | Pompushko |
| 2006/0122895 A1 | 6/2006 | Abraham et al. |
| 2007/0039209 A1 | 2/2007 | White et al. |
| 2007/0106670 A1 | 5/2007 | Yoakum et al. |
| 2007/0192183 A1 | 8/2007 | Monaco et al. |
| 2007/0271297 A1 | 11/2007 | Jaffe et al. |
| 2008/0097842 A1 | 4/2008 | Tirumala et al. |
| 2008/0177619 A1 | 7/2008 | Sugahara |
| 2008/0201603 A1* | 8/2008 | Ritz ................... G06F 11/2025 714/5.11 |
| 2009/0019648 A1 | 1/2009 | Jones et al. |
| 2009/0157799 A1 | 6/2009 | Sukumaran et al. |
| 2009/0198571 A1 | 8/2009 | Hanechak et al. |
| 2009/0216633 A1 | 8/2009 | Whitsett et al. |
| 2010/0121739 A1* | 5/2010 | McCarthy .................. 705/27 |
| 2010/0259473 A1 | 10/2010 | Sakata et al. |
| 2010/0269072 A1 | 10/2010 | Sakata et al. |
| 2010/0299616 A1* | 11/2010 | Chen et al. ................. 715/753 |
| 2010/0318442 A1 | 12/2010 | Paul et al. |
| 2011/0004524 A1 | 1/2011 | Paul et al. |
| 2011/0010274 A1 | 1/2011 | Sidlo et al. |
| 2011/0050656 A1 | 3/2011 | Sakata et al. |
| 2011/0054809 A1 | 3/2011 | Templeman |
| 2011/0055054 A1 | 3/2011 | Glasson |
| 2011/0099047 A1 | 4/2011 | Weiss et al. |
| 2011/0125678 A1 | 5/2011 | Partridge |
| 2011/0137678 A1 | 6/2011 | Williams |
| 2011/0184949 A1 | 7/2011 | Luo |
| 2011/0246509 A1 | 10/2011 | Migita et al. |
| 2012/0123867 A1 | 5/2012 | Hannan |
| 2012/0191492 A1 | 7/2012 | Diba et al. |
| 2013/0013439 A1 | 1/2013 | Smullen et al. |
| 2013/0066804 A1* | 3/2013 | Michael et al. ............ 705/36 R |
| 2013/0110666 A1 | 5/2013 | Aubrey |
| 2013/0173389 A1 | 7/2013 | Page et al. |
| 2013/0173413 A1 | 7/2013 | Page et al. |
| 2013/0254067 A1 | 9/2013 | Pirbhai |
| 2013/0290324 A1 | 10/2013 | Gibergues et al. |
| 2013/0297420 A1 | 11/2013 | Roberts et al. |
| 2013/0346117 A1 | 12/2013 | Fields et al. |
| 2014/0040007 A1 | 2/2014 | Relyea, Jr. et al. |
| 2014/0129373 A1 | 5/2014 | Menipaz |

FOREIGN PATENT DOCUMENTS

| | | |
|---|---|---|
| EP | 0823696 | 2/1998 |
| JP | 2004118269 | 4/2004 |
| JP | 2005354655 | 12/2005 |
| JP | 2006085385 | 3/2006 |
| WO | 9202008 | 2/1992 |
| WO | 2006085385 | 8/2006 |
| WO | 2011002787 | 1/2011 |
| WO | 2011049251 | 4/2011 |

OTHER PUBLICATIONS http://www.fluid-blog.com/2009/05/15miadidascom-site-review, May 15, 2009.

European Patent Application No. 20120190307, Extended Search Report, dated Sep. 9, 2013, 6 pages.

European Patent Application No. 20120196923, Extended Search Report, dated Apr. 3, 2013, 7 pages.

European Patent Application No. 20120196928, Extended Search Report, dated Apr. 2, 2013, 7 pages.

European Patent Application No. 20120196932, Extended Search Report, dated Apr. 3, 2013, 6 pages.

Fachen et al., "Customer-Led Online Open Innovation of Consumer Goods: A Multiple-Case Study", Management and Service Science (MASS), International Conference ON, IEEE, Aug. 12, 2011. pp. 1-4.

Marmasse et al., "Location-Aware Information Delivery with Com-Motion", Lecture Notes in Computer Science/Computational Science, Springer, DE, vol. 1927, Sep. 25, 2000. pp. 157-171.

Nakatsuru et al., "Context-Aware Information Provision to the Mobile Phone Standby Screen", Mobile Data Management, 7th International Conference, IEEE, 2006, 7 pages.

Takeuchi et al., "CityVoyager: An Outdoor Recommendation System Based on User Location History", J. Ma et al. (Eds.) UIC 2006, LNCS 4159, pp. 625-636.

Seckington, Nike iD: Design Your Own Shoes, retrieved from the internet: https://web.archive.org/web/20080506082706/http:I/missgeeky.com/2008/04/03/nike-id-design-your-own-shoes/, Apr. 3, 2008.

* cited by examiner

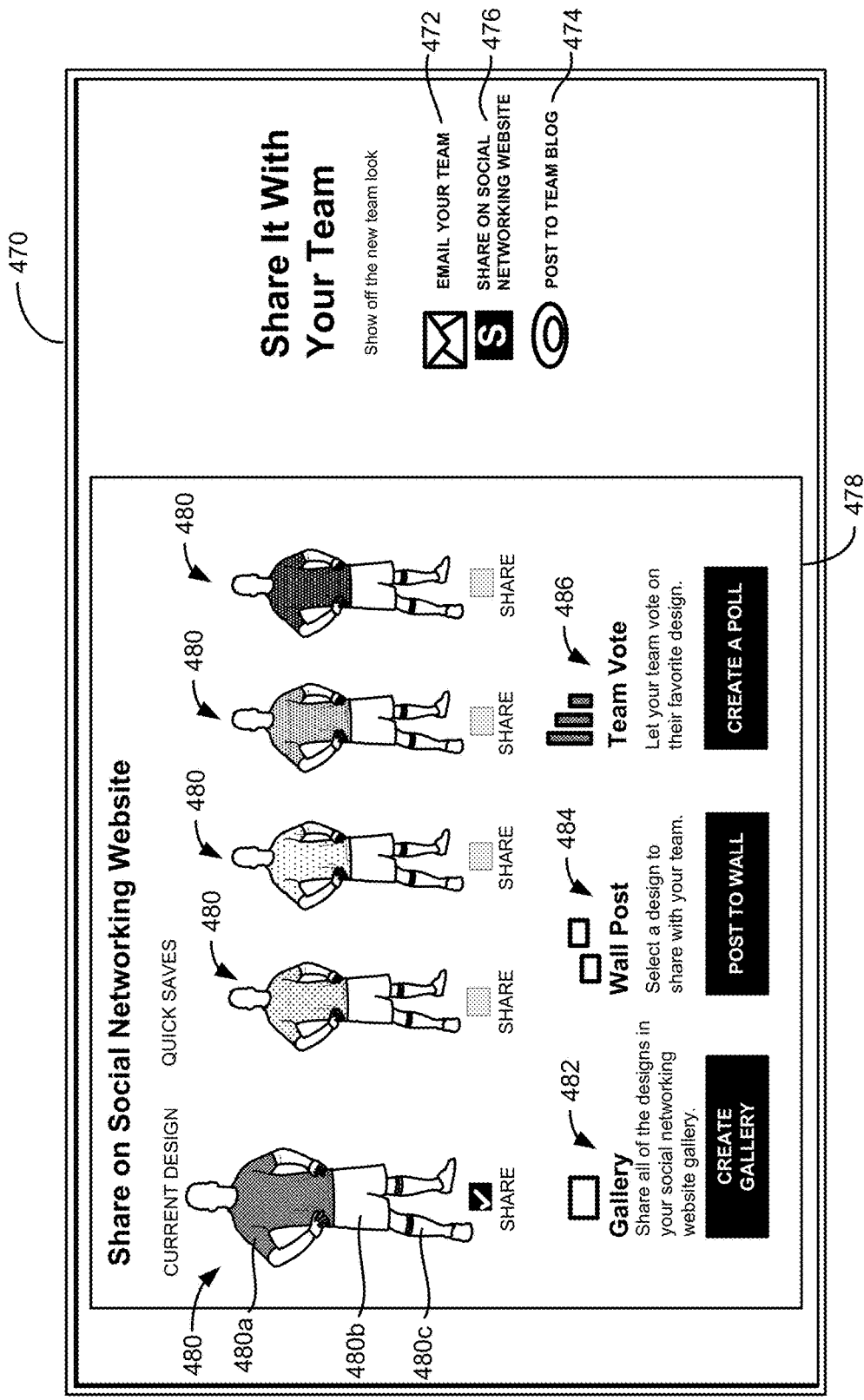

OFFERING A CUSTOMIZED COLLECTION OF PRODUCTS

CROSS-REFERENCES TO RELATED APPLICATIONS

This application incorporates by reference the disclosures of two copending U.S. patent applications. These copending U.S. patent applications are "Retail System With Location-Based Customization," filed by Alison Page, U.S. application Ser. No. 13/340,870, filed on Dec. 30, 2011, and "Customization Based on Physiological Data," filed by Alison Page, U.S. application Ser. No. 13/340,899, filed on Dec. 30, 2011. The disclosures of each of these two applications are hereby incorporated herein in their entireties by this reference.

FIELD OF THE INVENTION

The invention relates to retail systems or the like.

BACKGROUND

Embodiments of the present invention relate to customizing products over a network, and in particular to customizing a collection of products over the Internet. Customized sporting products, such as customized sporting apparel and customized sporting equipment, can provide significant benefits when undertaking a wide variety of activities. For example, customized sporting items can help people adapt to different environmental conditions. For some activities, customized sporting items can contribute to, and even enhance, performance. For example, customizing the size of a sporting item to an individual user, e.g. to the specific size, weight or body measurements of an athlete, results in a sporting item that has an optimal fit for this particular athlete, thereby leading to an improved usability during a sports activity and hence to improved performance of the athlete.

Product customization over the Internet is a fast-emerging market due in no small part to modern advances in technology. Product customization has its roots in individual tailoring. That is, if someone desired a customized product, such as a t-shirt with a hand-drawn image embedded on the front, that person would take the drawing to a nearby tailor. The tailor would then begin with a base garment such as a white t-shirt and subsequently use any suitable method (such as by heat pressing a piece of transfer paper having the desired image) to embed the image on the garment.

Today, this similar model has been applied to Internet technology so as to reduce the consumer's burden of visiting the tailor. That is, websites are available that allow consumers to customize a product using their computer. The website typically provides digital images of the base product, such as a white t-shirt or coffee mug. The consumer may then input text or select an image provided by the website to have formed on the base product, or may even upload their own image to have formed on the base product. Upon ordering, the customized product is then shipped to the consumer.

While the advances in providing customized products to consumers have been significant, they still suffer from numerous deficiencies. For example, the focus on individual consumers makes the customization of more than one product for groups of consumers very inconvenient and inefficient. Further, using today's individual-focused techniques, there are simply no provisions for relating products to one another and customizing those related products. This is not surprising, however, as today's techniques evolved from the historical model of customizing single products for single individuals.

BRIEF SUMMARY

Embodiments of the present invention overcome some or all of the aforementioned deficiencies in the related art. According to some embodiments, methods, apparatuses, and systems for customizing a collection of products are disclosed. The products may be any suitable products, and in certain embodiments are products associated with a sports team (including, e.g., player clothing such as shirts, shorts, socks; fan paraphernalia such as umbrellas, chairs, etc. and the like). To customize the collection of products, i.e., the products for the sports team, a person of authority or administrator may first set common customizations (such as a team logo and team colors). After the common customizations have been made, the customized products may be further customized by other individuals, such as team players. The team players may further customize the products by adding their own individual customizations in addition to those made by the administrator. For example, a team player may add their name, number, marks showing a number of touchdowns or other physical or performance attributes such as height, weight, speed, and the like.

In certain embodiments, the administrator may set limits on any further customizations. For example, the coach may limit the font and location that a team player may use for her name. In other embodiments, different limits may be set based on the category of individuals associated with the product. For example, where a team member is associated with a product such as a team shirt, the coach/administrator may place stringent customization limits as mentioned. However, where a fan or other member of the public is associated with a product such as a beer cooler, the administrator may place less stringent limits on the customization available to the fan, such as by letting the fan place any information or graphics anywhere on the product except for over a team or sponsor logo.

For a more complete understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

BRIEF DESCRIPTION OF THE DRAWINGS

FIG. 4C shows an example webpage that may be associated with operation 214 discussed with reference to FIG. 2.

DETAILED DESCRIPTION

Embodiments of the present invention generally relate to customizing a collection of products over the Internet.

Figure 1:
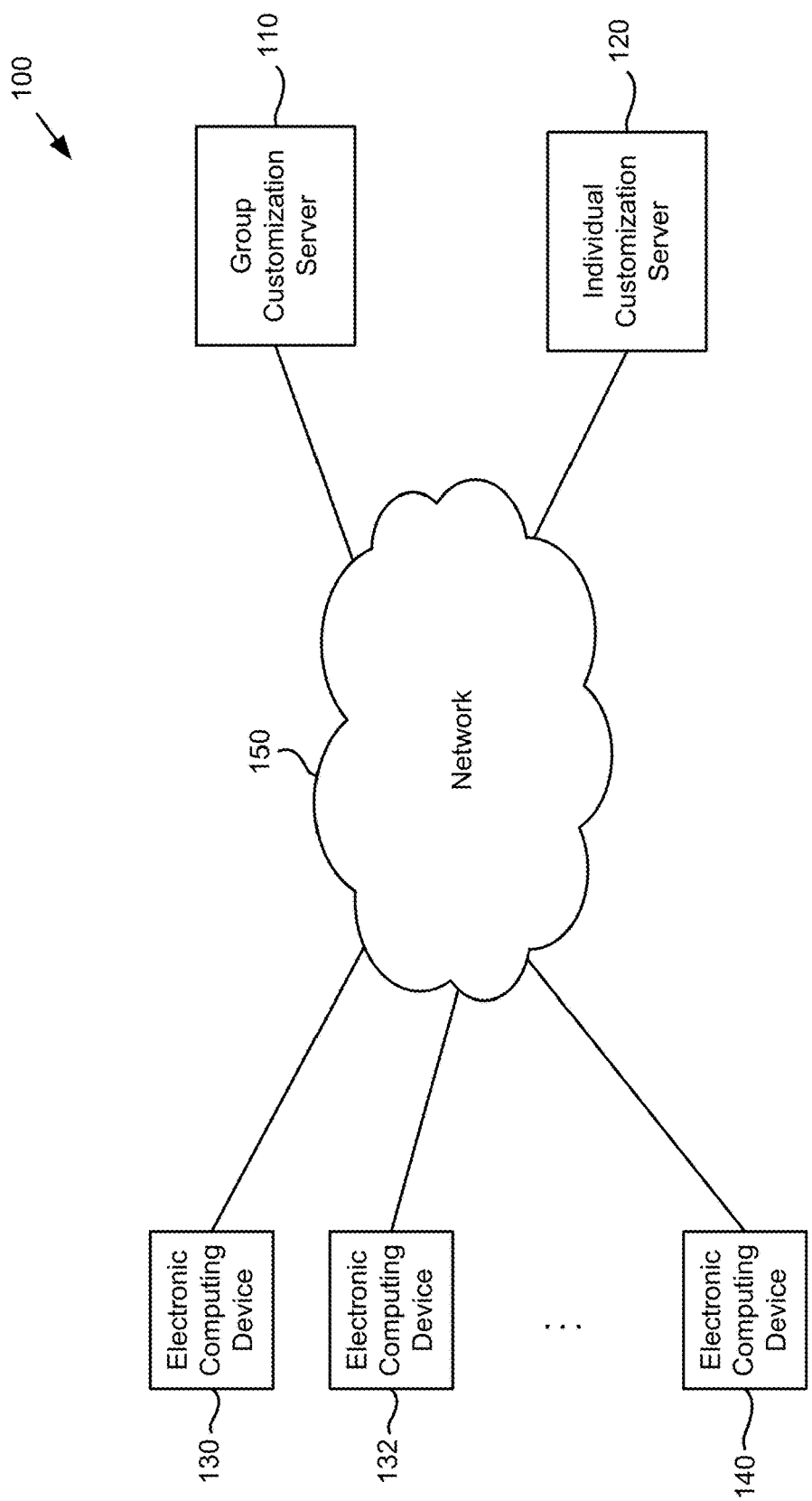
FIG. 1 is a simplified system illustrating exemplary environments for implementing aspects of one or more of the various embodiments disclosed herein.

FIG. 1 is a simplified system 100 illustrating an example environment for implementing aspects of one or more of the various embodiments disclosed herein. System 100 includes a group customization server 110, an individual customization server 120, and one or more electronic computing devices 130-140, all interconnected via a network 150.

Group customization server 110 is any suitable computing device for storing information, processing information, and communicating with other electronic devices such as electronic computing devices 130-140 and individual customization server 120. Group customization server 110 may be a single computer server or a network of computing devices. For example, group customization server 110 can be a large mainframe computer, a minicomputer cluster, or a group of servers functioning as a unit. In one example, group customization server 110 may be a database server coupled to a Web server (not shown). Group customization server 110 may include any suitable elements for processing information, such as a computer readable medium (CRM) embodied by one or more memory devices, and a processor operatively coupled to the CRM. The CRM may comprise code for performing the functions of group customization server 110, where the processor is operable to execute the code. Group customization server 110 may also include any suitable elements for establishing electronic communications with other electronic devices, such as a network interface, antenna, and the like all operatively coupled to the processor.

Individual customization server 120 is any suitable computing device for storing information, processing information, and communicating with other electronic devices such as electronic computing devices 130-140 and group customization server 110. Individual customization server 120 may be a single computer server or a network of computing devices. For example, individual customization server 120 can be a large mainframe computer, a minicomputer cluster, or a group of servers functioning as a unit. In one example, individual customization server 120 may be a database server coupled to a Web server (not shown). Individual customization server 120 may include any suitable elements for processing information, such as a computer readable medium CRM embodied by one or more memory devices, and a processor operatively coupled to the CRM. The CRM may comprise code for performing the functions of individual customization server 120, where the processor is operable to execute the code. Individual customization server 120 may also include any suitable elements for establishing electronic communications with other electronic devices, such as a network interface, antenna, and the like all operatively coupled to the processor.

Figure 2:
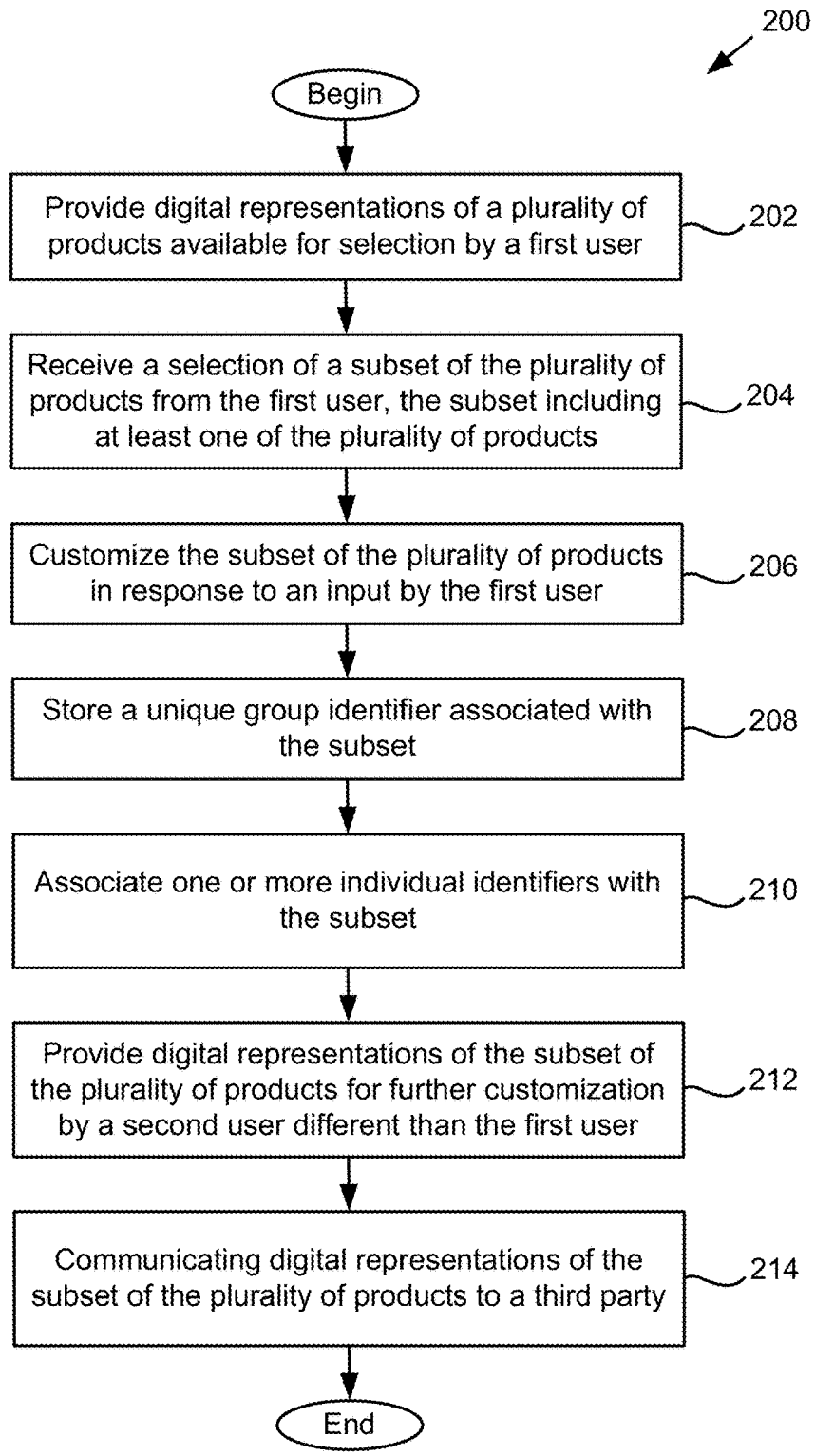
FIG. 2 is a flowchart depicting exemplary operations of a group customization server in accordance with at least one embodiment.
Figure 3:
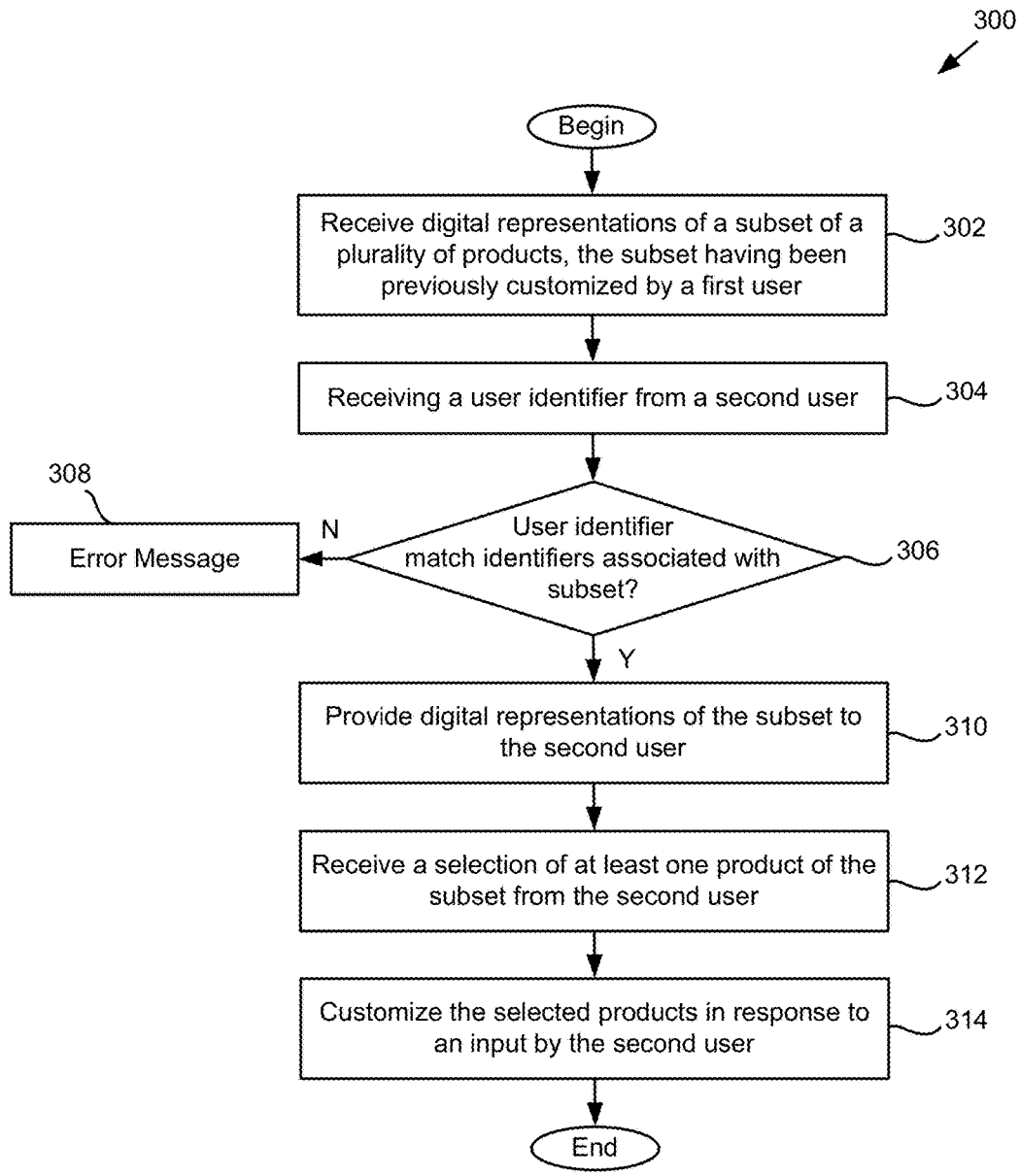
FIG. 3 is a flowchart depicting exemplary operations of an individual customization server in accordance with at least one embodiment.

In some embodiments, group customization server 110 and individual customization server 120 are provided as a single entity. Accordingly, although the functionality described herein is primarily discussed in the context of group customization server 110 and individual customization server 120 being independent entities, one skilled in the art would readily recognize that all such functionality could be performed by only one of group customization server 110 and individual customization server 120. For example, the various operations discussed with reference to FIG. 2 are discussed as operations performed by group customization server 110, whereas the various operations discussed with reference to FIG. 3 are discussed as operations performed by individual customization server 120. However, some or all of the operations discussed with reference to FIGS. 2 and 3 may be performed only by group customization server 110 or only by individual customization server 120. For another example, all of the operations discussed with reference to FIGS. 4A to 5B may be performed by a single entity such as group customization server 110 or individual customization server 120.

Electronic computing devices 130-140 are any suitable electronic computing devices for receiving user inputs, communicating the user inputs to other devices such as customization server 110 and individual customization server 120, and for receiving information from other devices such as customization server 110 and individual customization server 120. For example, electronic computing devices 130-140 can be hand-held and compact so that they can be easily carried or fit into a user's pocket. Alternatively, electronic computing devices 130-140 may be desk-mounted computing devices. Some examples of electronic computing devices 130-140 include laptop computers, desktop computers, tablet computers, netbooks, booklets, slates, convertible notebooks, mobile phones, personal digital assistants (PDAs), and the like. Electronic computing devices 130-140 may include any suitable elements for receiving input from and providing output to a user, such as a keypad, a microphone, a mouse, a touch-screen display, a speaker, etc. Electronic computing devices 130-140 may include any suitable elements for processing information, such as a CRM embodied by one or more memory devices, and a processor operatively coupled to the input/output devices and CRM. The CRM may comprise code for performing the functions of electronic computing devices 130-140, where the processor is operable to execute the code. Electronic computing devices 130-140 may also include any suitable elements for establishing electronic communications with other electronic devices, such as a network interface, antenna, and the like all operatively coupled to the processor. Electronic computing devices 130-140 may be the same or different than one another. Each electronic computing device may be operated by one or more users. In some embodiments, electronic computing device 130 is associated with and operated by a first user, and electronic computing device 140 is associated with and operated by a second user different than the first user.

Network 150 is any suitable network for enabling communications between various entities, such as between electronic computing devices 130-140, group customization server 110, and individual customization server 120. Such a network may include, for example, a local area network, a wide-area network, a virtual private network, the Internet, an intranet, an extranet, a public switched telephone network, an infrared network, a wireless network, a wireless data network, a cellular network, or any other such network or combination thereof. The network may, furthermore, incorporate any suitable network topology. Examples of suitable network topologies include, but are not limited to, simple point-to-point, star topology, self organizing peer-to-peer topologies, and combinations thereof. Components utilized for such a system may depend at least in part upon the type of network and/or environment selected. Network 150 may utilize any suitable protocol, such as TCP/IP, OSI, FTP, UPnP, NFS, CIFS, and AppleTalk. Communication over the network may be enabled by wired or wireless connections, and combinations thereof. In this example, network 150 includes the Internet, and the environment includes group customization server 110 and individual customization server 120 as Web servers for receiving requests from and serving content to electronic computing devices 130-140, although for other networks alternative devices serving similar purposes could be utilized as would be apparent to one of ordinary skill in the art.

The operation of each of the elements outlined with reference to FIG. 1 is further discussed with reference to FIGS. 2 to 6. In general, however, group customization server 110 and individual customization server 120 are operable to provide websites or other user interfaces for interacting with electronic computing devices 130-140. In this example, group customization server 110 and individual customization server 120 are Web servers and, as such, may run any of a variety of server or mid-tier applications, including HTTP servers, FTP servers, CGI servers, data servers, Java servers, and business application servers. Group customization server 110 and individual customization server 120 may also be capable of executing programs or scripts in response to requests from electronic computing devices 130-140, such as by executing one or more Web applications that may be implemented as one or more scripts or programs written in any programming language, such as Java®, C, C# or C++, or any scripting language, such as Perl, Python, or TCL, as well as combinations thereof.

System 100 in certain embodiments is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of system 100 in FIG. 1 should be taken as being illustrative in nature, and not limiting to the scope of the disclosure.

FIG. 2 is a flowchart 200 depicting example operations of group customization server 110 in accordance with at least one embodiment. The example operations show one or more steps that may be included in a method of pre-customizing products.

In operation 202, group customization server 110 provides digital representations of a plurality of products available for selection by a first user associated with electronic computing device 130. The products may be any suitable products that are offered for customization. For example, they may be sports attire (e.g., shirts, shorts, pants, arm sleeves, socks, hats, helmets, gloves, shoes, skates, etc.), sporting goods (e.g., balls, pucks, bats, clubs, hockey sticks, etc.) or any other sport or non-sport related good or product (e.g., household goods such as dishware, silverware, cookingware, computing goods such as mice, display devices, laptops, mobile phones, mobile phone covers, personal goods such as umbrellas, jewelry, watches, etc., office goods such as stationary, furniture, etc.). Digital representations of the products may be any suitable digital representation. For example, they may include one or more digital images of the product from one or more different perspective views, textual descriptions of the product, links to the product, etc. The digital representations may be provided to a user (such as a first user) of electronic computing device 130 in any suitable fashion. For example, they may be communicated to electronic computing device 130 via network 150 for display on a display device of electronic computing device 130.

In certain embodiments, the plurality of products constitute products that may be used for a sports team. For example, they include player clothes (shirt, shorts, and socks), goalkeeper clothes (shirt, shorts, socks, and gloves), training clothes (shirt, pants, and socks), fan gear (chairs, umbrellas, replica products etc.), and the like. The digital representations are digital images of the products.

In operation 204, group customization server 110 receives a selection of a subset of the plurality of products from the first user, where the subset includes at least one of the plurality of products. In some embodiments, the subset includes at least two of the plurality of products. The first user may select the subset in any suitable fashion. For example, the first user may use electronic computing device 130 to select the subset. This may be done, for example, by selecting a displayed image or other type of digital representation corresponding to the product. The displayed digital representation may be selected using any suitable input device of electronic computing device 130. After selecting a digital representation, electronic computing device 130 may communicate the selection to group customization server 110.

In some embodiments, each product in the subset is individually selected. For example, considering sports team products, the first user may select a player shirt by activating (e.g., clicking on) the displayed digital representation of the shirt. The first user may then individually select additional products by, for example, activating the displayed representation of another product such as shorts. In this fashion, each product is individually selected for customization by the first user.

In other embodiments, a number of products in the subset are simultaneously selected. For example, again considering sports team products, the first user may select a team player that is associated with multiple products (e.g., shirt, shorts, and socks). By making an individual selection of the team player, the multiple products associated with the team player are simultaneously selected. Each subset of products may be unique. For example, considering sports teams products, one subset may be associated with a team player, another subset may be associated with fan gear, and another subset may be associate with coaching goods. While the subset associated with the team player may include player-related products such as shirts, shorts, and socks, the subset associated with the fan gear may include fan-related products such as chairs and umbrellas In this fashion, unique subsets of products may be simultaneously selected for customization by the first user.

In some embodiments, the first user is a person with authority over general customization of the products. For example, where the products are sports team products, the first user may be a coach of the team, an owner of the team, a manager of the team, a league administrator or the like.

In operation 206, group customization server 110 customizes the selected subset of the plurality of products in response to an input by the first user. The customization may be any suitable customization, where customization instructions are provided by the first user to group customization server 110 via electronic computing device 130. Any suitable attribute of the products may be customized. For example, some attributes that may be customized include at least one of a color of the products, a color pattern provided on the products, a logo, a location of the logo, a size of the logo, a shape of the products, and a material from which the products are manufactured.

The customization may be performed in any suitable manner. In certain embodiments, customized information may be uploaded by the first user to group customization server 110. For example, an image such as a logo may be uploaded from electronic computing device 130 to group customization server 110. The uploaded image may then be selectively located on one or more of the products. Characteristics of the uploaded image may also be manipulated in any suitable fashion. For example, a size, color, etc. of the image may be manipulated before or after locating the image on the products. In other embodiments, customized information may be pre-stored on group customization server 110 and selected by the first user. For example, group customization server 110 may store a plurality of different images for use as a logo. The first user may then select, via electronic computing device 130, one of the images for placement on a product. Characteristics of the preloaded image may also be manipulated in any suitable fashion. In yet other embodiments, textual, graphic, or other descriptions of a customization may be communicated to group customization server 110, which may then operate to acquire a customization based on the description. For example, a textual description of a desired image may be communicated to group customization server 110 via electronic computing device 130. Group customization server 110 may then forward such information to another entity, which may operate to interpret the description and generate the desired image. The other entity may then communicate the desired image to group customization server 110 for forwarding to the first user, or may communicate the desired image directly to the first user. Or, group customization server 110 itself may operate to interpret the description and generate and communicate the desired image.

In some embodiments, the subset of products may be customized in sequential order. For example, after selecting a first product, the first product from the subset may be customized. Once customization is complete for the first product, a second product from the subset may be customized. This may continue until all of the products in the subset have been customized.

In other embodiments, some or all of the subset of products may be simultaneously customized. For example, a common feature of the products may be selected. The common feature may be any suitable feature that the first user desires to be common to multiple products. For example, the common feature may include at least one of a color of the products, a color pattern provided on the products, a logo, a location of the logo, a size of the logo, a shape of the products, and a material from which the products are manufactured. In certain embodiments, once the common feature is selected, the common feature may be simultaneously manipulated across the subset. For example, the first user may select a subset of products constituting player clothes (shirt, shorts, and socks). The first user may then upload a logo for display on the front of the shirt, and then select the logo as being a common feature. In response to selecting the logo as being a common feature, group customization server 110 may place the logo in any suitable location on the shorts and socks (e.g., a default location). In the event the first user changes the logo (e.g., uploads a different logo, changes a size or color of the logo, moves a location of the logo, etc.) the logos on the shorts and socks are automatically changed to match the changes in the shirt logo.

In one embodiment, group customization server 110 sets limits on the further customization available to a second user. Group customization server 110 may set such limits automatically, based on any suitable attribute of the products (e.g., type, shape, size, etc.). Alternatively, such limits may be communicated to group customization server 110. For example, the first user may communicate such limits to group customization server 110 via electronic computing device 130. The limits may be any suitable limits. For example, they may limit the further customization of at least one of a color of the products, a color pattern provided on the products, a logo, a location of the logo, a size of the logo, a shape of the products, and a material from which the products are manufactured, a location of text, a font of the text, a size of the text, a color of the text, and content of the text.

In certain embodiments, the limits may be tailored to individuals or groups authorized to further customize the products. For example, as discussed below with reference to operation 210, products may be associated with individual identifiers, public identifiers, and the like. Accordingly, different limits may be set for one or more categories of individuals and/or the public. For example, stringent limits may be set on individuals, allowing select individuals minimal latitude in further customization, while mild limits may be set on the public, allowing the public significant latitude in further customization. Returning to the sports team example, team players may be limited to customizing, e.g., player names and numbers for player clothes, whereas the public may be able to freely further customize fan gear. In another example, both players and the public may be able to further customize fan gear. In yet another example, while individuals may be able to further customize player clothes, the public may not be able to perform any further customization at all on player clothes. Brand owners for example, may desire that their trademark be located only in particular locations on the item and minimize customization options in that regard.

In other embodiments, each product may be customized more than once, resulting in a plurality of customized products corresponding to a single original product. The various customizations for the single product may then be stored by group customization server 110, and customized product identifiers may be associated with each version of a customized product. For example, a first user such as a team coach may first select and customize player clothes using a particular color pattern, logo placement, and the like. The team coach may then save those customized clothes. Subsequently, the coach may apply a different customization to the player clothes, using, for example, a different color pattern, logo placement, and the like. The team coach may then save the second set of customized player clothes. Any suitable entity, such as group customization server 110, may then generate and store a unique identifier such as a customized product identifier with each version of a customized product in order to identify each customization to a product or products. This may equally be applicable to groups of products. That is, a subset of products can be customized, and a product identifier associated with the customized subset. Multiple, customized subsets of products may thus be stored for subsequent use and/or viewing.

In operation 208, group customization server 110 stores a unique group identifier associated with the subset. The group identifier may identify the subset of products before and/or after customization by the first user. In some embodiments, the group identifier identifies multiple subsets of products before and/or after customization. For example, the group identifier may identify multiple customizations of the same subset of products. The group identifier may be set by any suitable entity. For example, the first user may be a sports team coach who, after selecting and customizing various products for the team, inputs an identifier such as "Team Huskies". The group identifier may then be associated with both the subset and one or more of the first user and the second user. For example, the group identifier could be associated with a login name of the first user and/or the second user. Alternatively, group customization server 110 may set the group identifier.

In operation 210, group customization server 110 associates one or more individual identifiers with the subset. In some embodiments, one or more individual identifiers may be associated with multiple subsets and/or multiple customizations of a single subset. The plurality of individual identifiers may be selected by any suitable entity. For example, they may be set by the first user. The plurality of individual identifiers may be stored by group customization server 110 or any other suitable device. The individual identifiers may correspond to identities of individuals who are authorized to further customize the subset of products. For example, where the first user is a coach of a sports team, the first user may select the player names as individuals authorized to further customize the subset of products. Further, the individual identifiers may assume any suitable form for identifying an individual entity. For example, the individual identifier may be an email address, a user name, a unique code, a password, biometric information such as a fingerprint or retinal scan, etc.

In some embodiments, some products may be further customizable by only the selected individuals, while other products may be further customizable by anybody. In cases where the product is customizable by anybody, the product or subset of products may be associated with a public identifier. For example, player clothes may be associated with individual identifiers such that only team players may further customize the player clothes, whereas fan gear may be associated with a public identifier, such that anybody may further customize the fan gear. In other embodiments, all products may be further customizable by anybody. Accordingly, all products may be associated with a public identifier.

In operation 212, group customization server 110 provides digital representations of the subset of the plurality of products for further customization by at least one second user different than the first user. In some embodiments, this may include digital representations of multiple subsets and/or multiple customizations of a single subset. The digital representations may be any suitable digital representations as previously discussed. The digital representations may be provided to any suitable entity. In some embodiments, group customization server 110 provides the digital representations to individual customization server 120. In other embodiments, group customization server 110 may provide the digital representations from one element (e.g., a subroutine) to another element (e.g., another subroutine) within group customization server 110. For example, in embodiments where all customization is performed by one server, such as group customization server 110, the digital representations may be provided from a group customization subroutine to an individual customization subroutine, both located within group customization server 110.

In certain embodiments, various other information may be provided for facilitating further customization by a second user. For example, customization limits may be communicated to group customization server 110. The customization limits may be the limits set during operation 206 (i.e., the limits on the further customization available to the second user). For other examples, the customized product identifier set during operation 206, the group identifier stored in operation 208, the individual identifiers set in operation 210, and/or the public identifier set in operation 210 may be communicated to group customization server 110.

In operation 214, group customization server 110 communicates digital representations of the subset of the plurality of products to a third party. In some embodiments, this may include digital representations of multiple subsets and/or multiple customizations of a single subset. The digital representations may be any suitable digital representations as previously discussed. The third party may be any suitable third party.

In certain embodiments, the third party is a social networking site. The digital representations may be sent to the social networking site to interact with any suitable functionality of the social networking site. For example, the digital representations may be sent to a photo gallery hosted by the social networking site and associated with the first user. They may be posted on a wall, bulletin board, or the like hosted by the social networking site and associated with the first user. They may be used to create a poll on the social networking site, where individuals (e.g., members of the team) or anybody (e.g., the public) may be invited to vote on the desirability of the digital representations (e.g., multiple team outfit designs).

In other embodiments, the third party is an individual. For example, the digital representations may be sent to one or more email addresses associated with individuals (e.g., team players such as the second user) or entities. For another example, the digital representations may be sent to other types of accounts associated with individuals, such as instant messaging accounts.

In yet other embodiments, the third party is a blog web site. For example, a web site may host a blog associated with the first user and/or the second user. The digital representations may be sent to that web site for posting on the blog.

It should be appreciated that the specific steps illustrated in FIG. 2 provide a particular method of pre-customizing products, according to certain embodiments of the present invention. Other sequences of steps may also be performed according to alternative embodiments. For example, alternative embodiments of the present invention may perform the steps outlined above in a different order. Moreover, the individual steps illustrated in FIG. 2 may include multiple sub-steps that may be performed in various sequences as appropriate to the individual step. Furthermore, additional steps may be added or existing steps removed depending on the particular applications. One of ordinary skill in the art would recognize and appreciate many variations, modifications, and alternatives.

FIG. 3 is a flowchart 300 depicting example operations of individual customization server 120 in accordance with at least one embodiment. The example operations show one or more steps that may be included in a method of customizing pre-customized products.

In operation 302, individual customization server 120 receives digital representations of a subset of a plurality of products, where the subset has been previously customized by a first user. In some embodiments, this may include digital representations of multiple subsets and/or multiple customizations of a single subset. Individual customization server 120 may receive the digital representations from any suitable entity. For example, individual customization server 120 may receive the digital representations from group customization server 110. The digital representations may correspond to those customized by the first user in accordance with one or more of the operations discussed with reference to FIG. 2. In certain embodiments, individual customization server 120 may receive additional information concerning the subset(s) of the plurality of products. For example, individual customization server 120 may receive any of the various other information discussed above with reference to operation 212.

In operation 304, individual customization server 120 receives a user identifier from a second user. The user identifier may be received from any suitable device over any suitable communication medium. For example, the second user may be associated with electronic computing device 140, the second user may enter a user identifier into electronic computing device 140, and electronic computing device 140 may subsequently communicate the user identifier to individual customization server 120 via network 150.

In operation 306, individual customization server 120 determines whether the received user identifier matches one or more received individual identifiers associated with the subset(s). This may be done by, for example, comparing the received user identifier with the one or more received individual identifiers. Such a step may be performed to determine whether or not the second user is authorized to perform additional customizations to any of the subset of products, and if so, to what extent. If, as a result of the comparison, individual customization server 120 determines that the received user identifier does not match the one or more received individual identifiers, processing may continue to operation 308, in which case an error message may be communicated to electronic computing device 140. If, on the other hand, individual customization server 120 determines that the received user identifier does match the one or more received individual identifiers, processing may continue to operation 310.

In some embodiments, individual customization server 120 may provide digital representations of one or more products that are associated with a public identifier. In this case, anybody may be free to further customize the product. Accordingly, operations 302-308 are clearly optional.

In operation 310, digital representations of the subset are provided to the second user. In some embodiments, this may include digital representations of multiple subsets and/or multiple customizations of a single subset. In this case, the digital representations represent the subset(s) of products that have already been customized by the first user. The digital representations may be any suitable digital representation. For example, they may include one or more digital images of the pre-customized product from one or more different perspective views, textual descriptions of the pre-customized product, etc. The digital representations may be provided to the second user via electronic computing device 140 in any suitable fashion. For example, they may be communicated to electronic computing device 140 via network 150 for display on a display device of electronic computing device 140.

In certain embodiments, individual customization server 120 may check to determine whether one or more public identifiers are associated with one or more products. If individual customization server 120 determines that a public identifier is associated with one or more products, processing may begin at operation 310 for such products. That is, digital representations of the subset of products associated with the public identifier may be provided to the second user.

In another embodiment, individual customization server 120 may read one or more group identifiers received from, e.g., group customization server 110. The group identifiers may be used to determine which digital representations of products to provide to the second user. For example, where the second user is associated with a group identifier, individual customization server 120 may provide digital representations of the subset(s) of products identified by the group identifier. The second user may be associated with no, one, or more than one group identifier. Accordingly, the second user may be provided with no, one, or more than one subset of products available for further customization.

In operation 312, individual customization server 120 receives a selection of at least one product of the subset from the second user. The second user may select products from the subset in any suitable fashion, similar to the selection of products discussed above with reference to FIG. 2, however in this case in the context of a second user associated with electronic computing device 140. Further, similar to the technical features discussed above with reference to FIG. 2, each product in the subset may be individually selected, and/or a number of products in the subset may be simultaneously selected.

In operation 314, individual customization server 120 customizes the selected products in response to an input by the second user. All of the technical features associated with customizing discussed above with reference to FIG. 2 are similarly applicable to the individual customization. However, in this case, limitations on the customizations available to the second user may exist. In such a case, the second user may be limited in the scope of customizations available to them.

In some embodiments, individual customization server 120 may receive customization limits associated with one or more individual identifiers, public identifiers, group identifiers, and the like. The customization limits may be any of those discussed above with reference to FIG. 2. If a received user identifier associated with the second user corresponds to any of these individual identifiers for a given product, the customizations available to the second user are limited by the limits defined by the received customization limits. For example, in the context of sports teams, a coach (e.g., first user) may initially customize player clothes by providing logo(s), color patterns, etc. The coach may then limit the players (e.g., second user) to adding their name in a predetermined font, size, color, etc. Accordingly, the customization available to the players in this example are limited to only providing their name in a predetermined font, size, color, etc.

In some embodiments, once customization is completed by individual customization server 120, the second user may request the customized product. In doing so, individual customization server 120 may provide the price of the product to the second user, and the second user may provide order information such as a credit card number, billing address, shipping address, and the like. The customized product and order information may form an order request communicated to and received by individual customization server 120. Accordingly, individual customization server 120 may fulfill the order. In other embodiments, group customization server 110 may fulfill the order. For example, individual customization server 120 may receive the order request and forward it to group customization server 110 for processing. For another example, individual customization server 120 may redirect the second user to group customization server 110, and forward the necessary customized product information (e.g., information identifying the customizations made by the second user) to group customization server 110. Group customization server 110 may then request the order information from the second user and process the order using the requested order information and forwarded customized product information.

It should be appreciated that the specific steps illustrated in FIG. 3 provide a particular method of customizing pre-customized products, according to an embodiment of the present invention. Other sequences of steps may also be performed according to alternative embodiments. For example, alternative embodiments of the present invention may perform the steps outlined above in a different order. Moreover, the individual steps illustrated in FIG. 3 may include multiple sub-steps that may be performed in various sequences as appropriate to the individual step. Furthermore, additional steps may be added or existing step removed depending on the particular applications. One of ordinary skill in the art would recognize and appreciate many variations, modifications, and alternatives.

Figure 4A:
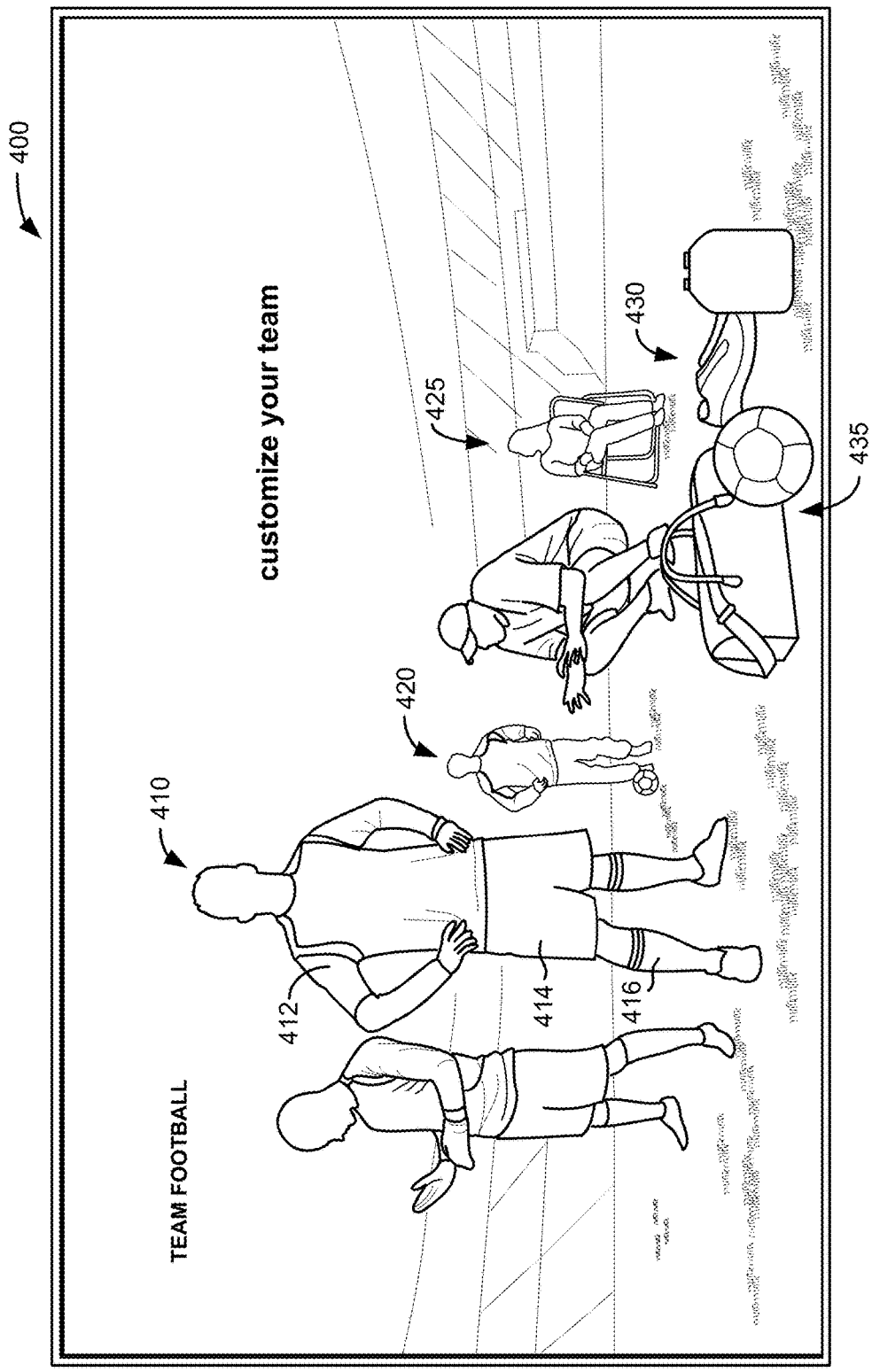
FIG. 4A shows an example webpage that may be associated with operations 202 and 204 discussed with reference to FIG. 2.
Figure 4B:
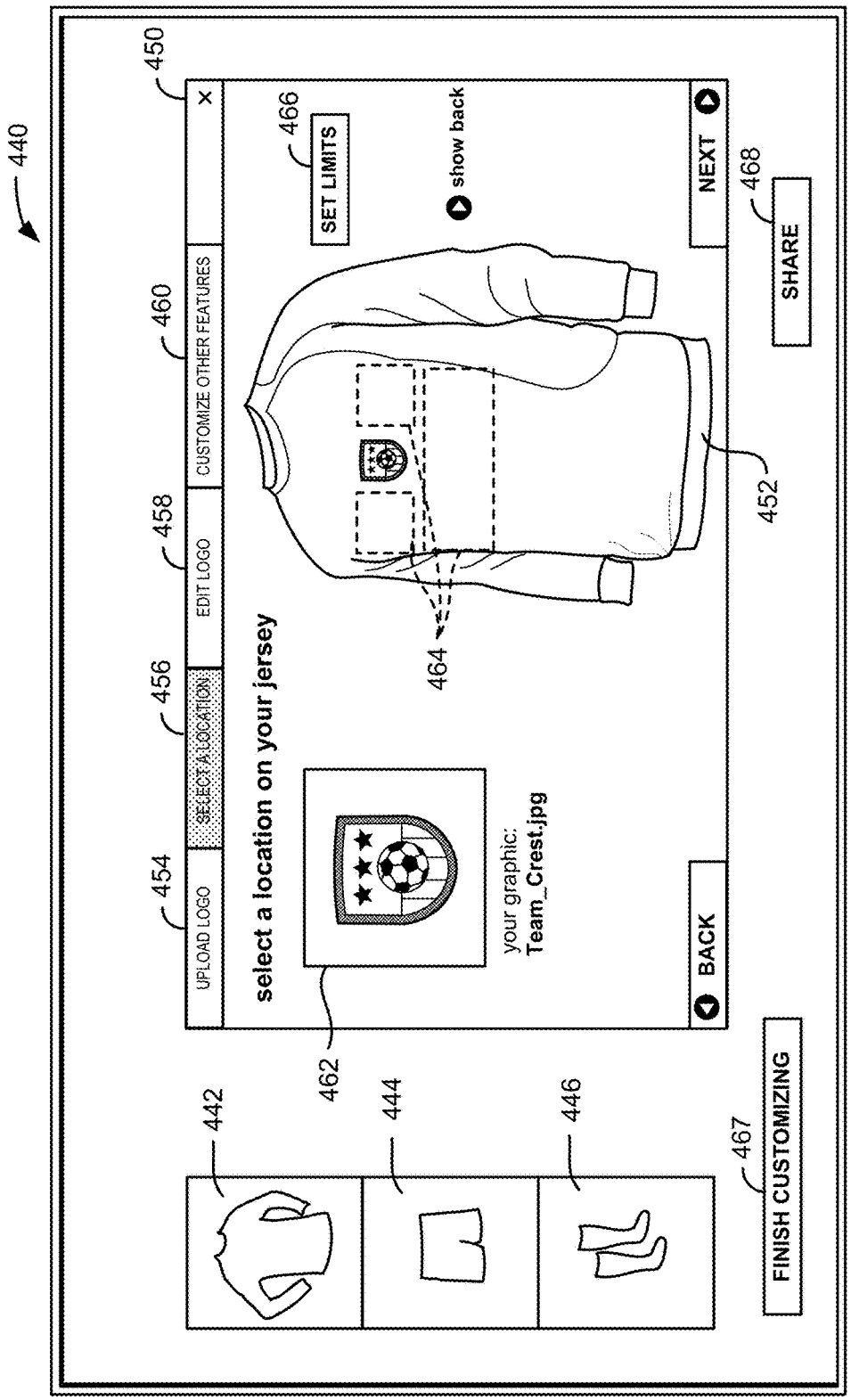
FIG. 4B shows an example webpage that may be associated with operation 206 discussed with reference to FIG. 2.

FIGS. 4A to 4C show example webpages that may be provided to a first user by group customization server 110. The webpages may be provided to the first user in any suitable fashion. For example, they may be communicated to electronic computing device 130 for display on a display device of electronic computing device 130.

FIG. 4A shows an example webpage 400 that may be associated with operations 202 and 204 discussed with reference to FIG. 2. In accordance with operation 202, group customization server 110 may provide webpage 400 to the first user via electronic computing device 130. Webpage 400 includes numerous digital representations of products. For example, webpage 400 includes a digital representation of player clothes 410, training clothes 420, fan gear 425, footwear 430, and accessories 435. Each of these products may include one or more products. For example, player clothes 410 includes a shirt 412, shorts 414, and socks 416. In this example, the first user is the team coach, and is authorized to perform preliminary customization and set limits on further customization.

In accordance with operation 204, the coach may select one or more products displayed on webpage 400 for customization. For example, the coach may independently select, via electronic computing device 130, shirt 412, shorts 414, or socks 416, for customization. For another example, the coach may select player clothes 410, in which case shirt 412, shorts 414, and socks 416 may be selected in response to such a selection. In this example, the coach selects player clothes 410, in which case group customization server 110 prepares shirt 412, shorts 414, and socks 416 for customization by the coach.

FIG. 4B shows an example webpage 440 that may be associated with operation 206 discussed with reference to FIG. 2. In response to the coach's selection of products for customization, group customization server 110 subsequently customizes the selected products.

In this example, webpage 440 displays graphical images of the products selected for customization, including a shirt image 442, a shorts image 444, and a socks image 446. These images may be user-selectable, such that the coach may select any of these images for customization of the associated product. In this case, the coach has selected shirt image 442 to customize the player's shirt. In response to such a selection, group customization server 110 displays a configuration window 450 which provides various customization options available to the coach. Configuration window 450 displays an editable version of the shirt image 452. Configuration window 450 also displays various options for customizing the shirt including, for example, user-selectable elements (such as buttons) for uploading a logo 454, selecting a location of an uploaded logo 456, editing the uploaded logo 458, and customizing other features of the shirt 460. In response to selecting the upload logo button 454 and subsequently uploading the logo, an image of the logo uploaded by the user may be displayed in the logo display window 462. In response to selecting the location select button 456, available locations 464 may be displayed on the editable version of the shirt image 452, where the available locations 464 indicate locations where the coach may place the uploaded image. In some embodiments, available locations 464 correspond to all locations on the product. In other embodiments, available locations 464 may be predetermined by group customization server 110. In response to selecting the edit logo button 458, the uploaded logo may be edited by the coach. In response to selecting the customize other features button 460, other features of the shirt may be customized, such as a color pattern, material, etc.

Further in this example, webpage 440 also displays a set limits button 466. In response to selecting the set limits button 466, the coach may input limits to be imposed on any further customization, and associate such limits with identifiers such as personal identifiers and/or public identifiers, as discussed with reference to operation 206. Webpage 440 also displays a finished customizing button 467. In response to selecting the finished customizing button 467, the customized features of the subset of products may be stored. Further, any limitations and associations with identifiers may also be stored. Webpage 440 also displays a share button 468. In response to selecting the share button 468, the one or more customized products may be shared with third parties, as further discussed with reference to FIG. 4C.

In one embodiment, some or all of the subset of products may be simultaneously customized. For example, after placing the logo on shirt image 452, the uploaded logo may be selected as a common feature among one or more of shorts 414 and socks 416. Upon selecting the uploaded logo as a common feature, group customization server 110 may place copies of the logo image on one or more of shorts image 444 and socks image 446. The logo may be placed in any suitable location. For example, the location may be preset by the first user. For another example, the location may be predetermined by group customization server 110. In some embodiments, the location of the logo may subsequently be manipulated.

FIG. 4C shows an example webpage 470 that may be associated with operation 214 discussed with reference to FIG. 2. Webpage 470 may display various options for communicating customized products to third parties. For example, an email button 472 may be provided. In response to user selection of the email button 472, the first user may select digital representations of one or more customized products to email to one or more other individuals, and enter the email addresses of the recipients to facilitate the email. A post-to-team-blog button 474 may be provided. In response to user selection of the post-to-team-blog button 474, the first user may select one or more digital representations of customized products to post on a blog, and enter blogsite information (e.g., username, password, URL, etc.) to facilitate the posting. A share-on-social-networking-website button 476 may be provided. In response to user selection of the share-on-social-networking-website button 476, a social sharing window 478 may be displayed.

Social sharing window 478 shows one or more saved customized products 480. In this example, the saved customized products 480 are customized player clothes, including customized shirts 480a, customized shorts 480b, and customized socks 480c. Customized shirts 480a have different colors. One or more of the saved customized products 480 may be selected for communication over a predetermined social networking site, and/or a social networking site configured by the first user. In this example, three different ways of sharing the selected, saved, customized products 480 are shown. In the first, digital representations of the selected customized products are communicated for display in a photo gallery 482 associated with the social networking site. In the second, digital representations of the selected customized products are communicated for display on a wall or bulletin board 484 associated with the social networking site. In the third, a poll 486 may be created using digital representations of the selected customized products, where one or more individuals may be allowed to vote on the selected customized products.

It should be appreciated that the specific features illustrated in FIGS. 4A to 4C provide a particular example of pre-customizing products, according to an embodiment of the present invention. Other features provided in other arrangements responsive to different sequences may be used according to alternative embodiments. One of ordinary skill in the art would recognize and appreciate many variations, modifications, and alternatives.

Figure 5A:
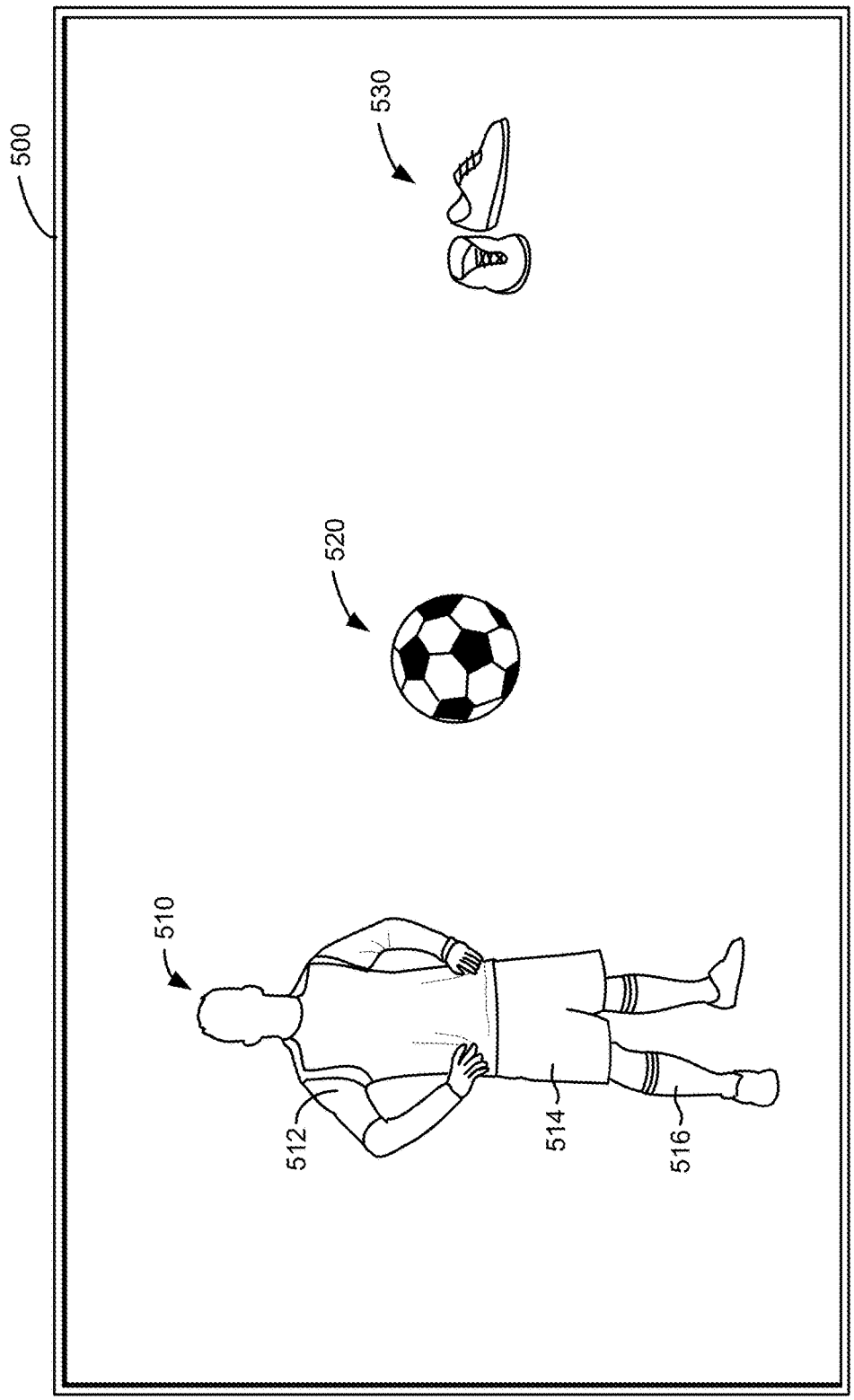
FIG. 5A shows an example webpage that may be associated with operations 310 and 312 discussed with reference to FIG. 3.
Figure 5B:
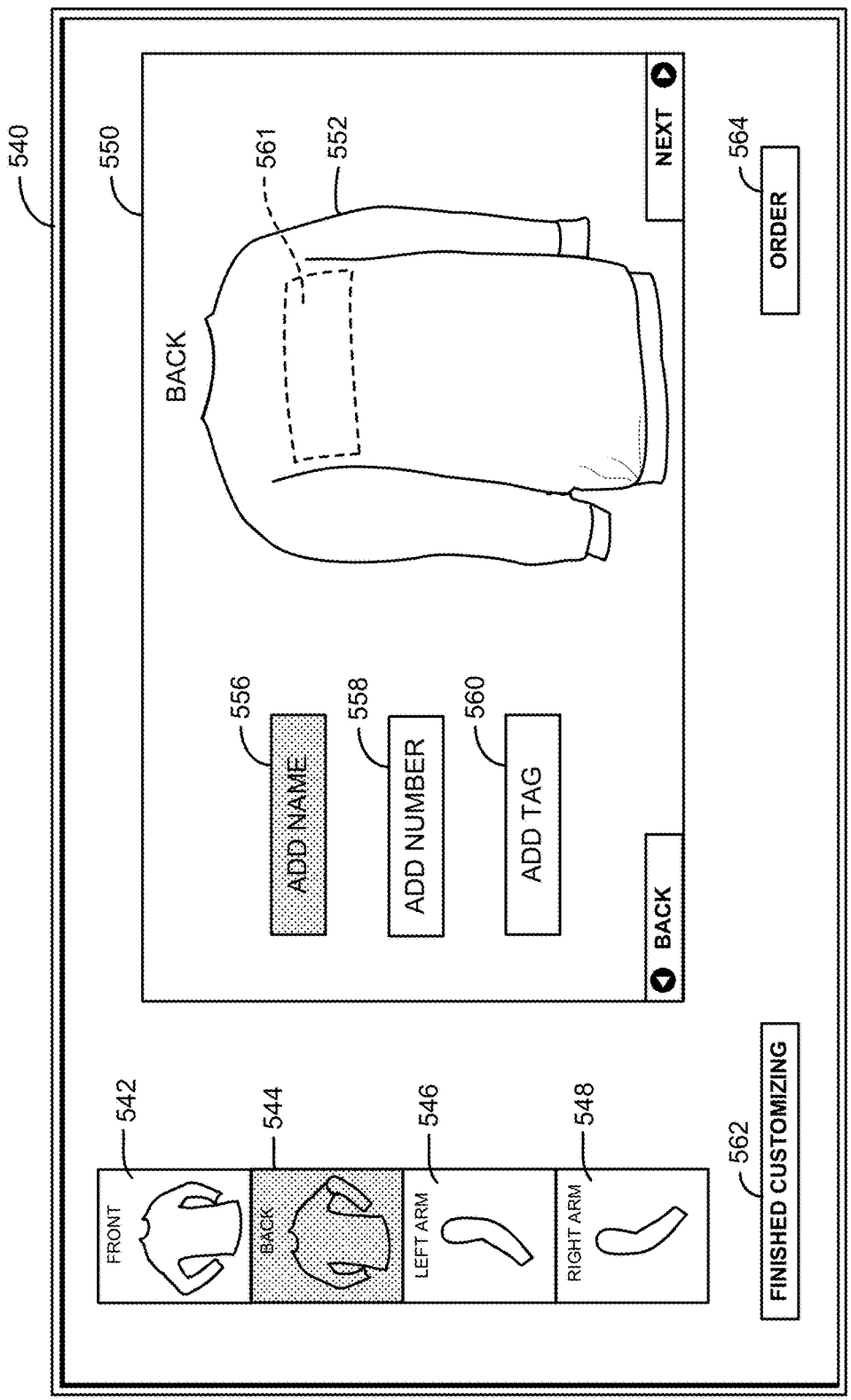
FIG. 5B shows an example webpage that may be associated with operation 314 discussed with reference to FIG. 3.

FIGS. 5A and 5B show example webpages that may be provided to a second user by individual customization server 120. In this example, the second user is a team member. FIG. 5A shows an example webpage 500 that may be associated with operations 310 and 312 discussed with reference to FIG. 3. In accordance with step 310, webpage 500 includes numerous digital representations of products that have been pre-customized by the coach. In one embodiment, the team member logs into the webpage with a user name. In response to the receiving the user name and matching the user name with team member names received from group customization server 110, individual customization server 120 may determine that the team member may further customize the products shown on webpage 500. In one embodiment, the products shown on webpage 500 may be identified by a group identifier (e.g., "Team Huskies") associated with the user name, and displayed in response to the second user selecting the group identifier.

Webpage 500 includes digital representations of customized player clothes 510, a customized accessory (soccer ball) 520, and customized footwear 530. Customized player clothes 510 includes a customized shirt 512, customized shorts 514, and customized socks 516. In accordance with step 312, the team member may select one or more products displayed on webpage 500 for further, personalized, customization. For example, the team player may independently select, via electronic computing device 140, customized shirt 512, customized shorts 514, or customized socks 516 for personalized customization. For another example, the team member may select customized player clothes 510, in which case customized shirt 512, customized shorts 514, and customized socks 516 may be selected in response to such a selection. In this example, the team player selects customized shirt 512 for further customization.

FIG. 5B shows an example webpage 540 that may be associated with operation 314 discussed with reference to FIG. 3. In response to the team player's selection of a product for further customization, individual customization server 120 customizes the select product.

In this example, webpage 540 displays graphical images of the product for customization from different perspectives. These include a front pre-customized shirt image 542, back pre-customized shirt image 544, left pre-customized shirt image 546, and right pre-customized shirt image 548. These images may be user-selectable, such that the team player may select any of these images for customization of the associated portion of the product. In this case, the team player has selected the back pre-customized shirt image 544 to further customize the back surface of the players shirt. In response to such a selection, individual customization server 120 displays a configuration window 550 which provides various customization options available to the team player. Configuration window 550 displays an editable version of the back pre-customized shirt image 552. The pre-customized shirt will include features that have already been customized by the coach. For example, the color pattern, including variations such as colored stripes, may be illustrated on the back pre-customized shirt image 552 and not modifiable by the team player.

Configuration window 550 also displays various options for further customizing the pre-customized shirt, for example, user-selectable elements (such as buttons) for adding a name 556, adding a number 558, and adding a tag 560, may be displayed. In response to selecting the add a name button 556, the team player may enter their personal name or other name to be provided on the shirt. The name may be limited by font, color, and the like, in accordance with limitations set by the coach. Here, the coach set a location limitation, so that the team players name must be provided in location 561. Similarly, in response to selecting the add a number button 558, the team player may enter their personal number or other number to be provided on the shirt, also limited to, e.g., location, font, etc. In response to selecting the add tag button 560, the team player may select or upload any other information such as images or text, that are not limited by the coach, and place the tag anywhere on the shirt.

Further in this example, webpage 540 also displays a finished individual customizing button 562. In response to selecting the finished individual customizing button 562, the further customized features of the selected products may be stored. Webpage 540 also displays an order button 564. In response to selecting the order button 564, the shirt may be ordered as discussed with reference to FIG. 3.

It should be appreciated that the specific features illustrated in FIGS. 5A and 5B provide a particular example of customizing pre-customized products, according to an embodiment of the present invention. Other features provided in other arrangements responsive to different sequences may be used according to alternative embodiments. One of ordinary skill in the art would recognize and appreciate many variations, modifications, and alternatives.

Figure 6:
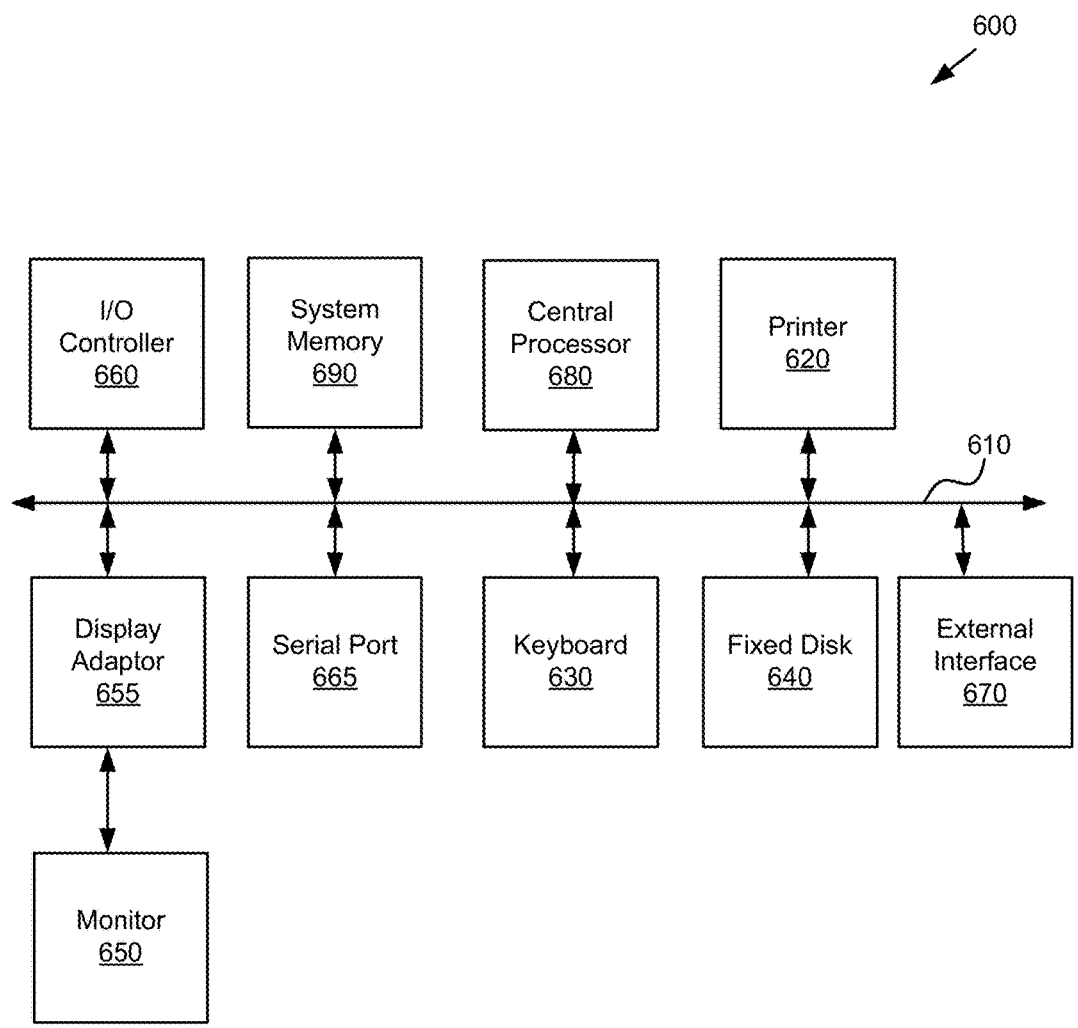
FIG. 6 is a diagram of a computer apparatus, according to exemplary embodiments.

FIG. 6 is a diagram of a computer apparatus 600, according to an example embodiment. The various participants and elements in the previously described system diagrams (e.g., the group customization server 110) may use any suitable number of subsystems in the computer apparatus to facilitate the functions described herein. Examples of such subsystems or components are shown in FIG. 6. The subsystems shown in FIG. 6 are interconnected via a system bus 610. Additional subsystems such as a printer 620, keyboard 630, fixed disk 640 (or other memory comprising tangible, non-transitory computer-readable media), monitor 650, which is coupled to display adapter 655, and others are shown. Peripherals and input/output (I/O) devices (not shown), which couple to I/O controller 660, can be connected to the computer system by any number of means known in the art, such as serial port 665. For example, serial port 665 or external interface 670 can be used to connect the computer apparatus to a wide area network such as the Internet, a mouse input device, or a scanner. The interconnection via system bus allows the central processor 680 to communicate with each subsystem and to control the execution of instructions from system memory 690 or the fixed disk 640, as well as the exchange of information between subsystems. The system memory 690 and/or the fixed disk 640 may embody a tangible, non-transitory computer-readable medium.

The software components or functions described in this application may be implemented as software code to be executed by one or more processors using any suitable computer language such as, for example, Java, C++ or Perl using, for example, conventional or object-oriented techniques. The software code may be stored as a series of instructions, or commands on a computer-readable medium, such as a random access memory (RAM), a read-only memory (ROM), a magnetic medium such as a hard-drive or a floppy disk, or an optical medium such as a CD-ROM. Any such computer-readable medium may also reside on or within a single computational apparatus, and may be present on or within different computational apparatuses within a system or network.

The present invention can be implemented in the form of control logic in software or hardware or a combination of both. The control logic may be stored in an information storage medium as a plurality of instructions adapted to direct an information processing device to perform a set of steps disclosed in embodiments of the present invention. Based on the disclosure and teachings provided herein, a person of ordinary skill in the art will appreciate other ways and/or methods to implement the present invention.

The use of the terms "a" and "an" and "the" and similar referents in the context of describing embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope unless otherwise claimed. No language in the specification should be construed as indicating any non-claimed element as essential to the practice of at least one embodiment.

Preferred embodiments are described herein, including the best mode known to the inventors. Variations of those preferred embodiments may become apparent to those of ordinary skill in the art upon reading the foregoing description. The inventors expect skilled artisans to employ such variations as appropriate, and the inventors intend for embodiments to be constructed otherwise than as specifically described herein. Accordingly, suitable embodiments include all modifications and equivalents of the subject matter recited in the claims appended hereto as permitted by applicable law. Moreover, any combination of the above-described elements in all possible variations thereof is contemplated as being incorporated into some suitable embodiment unless otherwise indicated herein or otherwise clearly contradicted by context. The scope of the invention should, therefore, be determined not with reference to the above description, but instead should be determined with reference to the pending claims along with their full scope or equivalents.

That which is claimed is:

1. A method for pre-customizing products, comprising:
   transmitting, by a group customization server to an electronic computing device over a network, digital representations of a plurality of products available for selection by a first user operating the electronic computing device;
   receiving, by the group customization server, a selection of a subset of the plurality of products from the electronic computing device, the subset including at least two of the plurality of products;
   receiving, by the group customization server, a selection of a common feature of the subset of the plurality of products from the electronic computing device;
   simultaneously customizing, by the group customization server, the subset of the plurality of products in response to an input from the electronic computing device by manipulating the common feature of the subset of the plurality of products;
   storing, by the group customization server, a group identifier with the customized subset of plurality of products, the group identifier identifying the customized subset of the plurality of products;
   receiving, by the group customization server, customization limits defining types of customizations available to a second user for further customization of the customized subset of plurality of products;
   receiving additional selections from the electronic computing device for associating, at the group customization server, an individual identifier with the customized subset of plurality of products, wherein the individual identifier corresponds to an identity of the second user authorized to further customize the customized subset of the plurality of products, the second user different than the first user, and wherein the individual identifier is associated with the customization limits defining the types of customizations available to the second user;
   transmitting, by the group customization server to an individual customization server, digital representations of the customized subset of the plurality of products for further customization by the second user operating a second electronic computing device communicating with the individual customization server, products; and
   wherein the individual identifier associated with the customized subset of the plurality of products enables further customizations to the customized subset of the plurality of products by the second user, the types of customizations available to the second user limited as defined in the customization limits associated with the individual identifier.

2. The method of claim 1, wherein the common feature includes at least one of: a color of the products, a color pattern provided on the products, a logo, a location of the logo, a size of the logo, a shape of the products, and a material from which the products are manufactured.

3. The method of claim 1, wherein setting limits includes limiting at least one of: a color of the products, a color pattern provided on the products, a logo, a location of the logo, a size of the logo, a shape of the products, and a material from which the products are manufactured, a location of text, a font of the text, a size of the text, a color of the text, and content of the text.

4. The method of claim 1, further comprising communicating digital representations of the subset of the plurality of products to a third party.

5. The method of claim 4, wherein communicating digital representations includes at least one of: communicating the digital representations to a social media website, and communicating the digital representations to the second user.

6. The method of claim 1, further comprising:
receiving, at the individual customization server, the group identifier identifying the customized subset of the plurality of products;
receiving, at the individual customization server, the customization limits defining the types of customizations available to the second user;
providing, by the individual customization server, digital representations of the customized subset of the plurality of products identified by the group identifier to the second user;
receiving, by the individual customization server, a selection of at least one products of the customized subset from the second user; and
customizing, by the individual customization server, the selected products in response to an input by the second user, wherein the selected products are customized according to the customization limits defining the types of customizations available to the second user.

7. A method for customizing pre-customized products, comprising:
receiving, at an individual customization server, a group identifier from a group customization server over a network;
determining, from the group identifier, a subset of a plurality of products previously customized by a first user, the subset of the plurality of products determined from a larger set of products;
receiving from the group customization server over the network, at the individual customization server, customization limits set by the first user, the customization limits defining types of customizations available to a second user different than the first user;
transmitting, by the individual customization server to an electronic computing device operated by the second user, digital representations of the subset of the plurality of products identified by the group identifier;
receiving, from the electronic computing device by the individual customization server, a selection of at least one product of the subset from the second user; and
customizing, by the individual customization server, the selected products in response to an input by the second user, wherein the selected products are customized according to the customization limits set by the first user.

8. The method of claim 7, wherein the subset includes at least one common feature configured by the first user.

9. The method of claim 8, wherein the common feature includes at least one of: a color of the products, a color pattern provided on the products, a logo, a location of the logo, a size of the logo, a shape of the products, and a material from which the products are manufactured.

10. The method of claim 7, wherein the set limitations includes limiting at least one of: a color of the products, a color pattern provided on the products, a logo, a location of the logo, a size of the logo, a shape of the products, and a material from which the products are manufactured, a location of text, a font of the text, a size of the text, a color of the text, and content of the text.

11. The method of claim 7, wherein the subset is associated with one or more individual identifiers, and the method further includes:
receiving a user identifier from the second user;
determine whether the received user identifier matches any of the one or more individual identifiers; and
performing the operations of providing digital representations, receiving a selection, and customizing the selected products only if it is determined that the received user identifier matches one of the one or more individual identifiers.

12. A group customization server, adapted to:
transmit, to an electronic computing device over a network, digital representations of a plurality of products available for selection by a first user operating the electronic computing device;
receive a selection of a subset of the plurality of products from the first user electronic computing device, the subset including at least two of the plurality of products;
receive a selection of a common feature of the subset of the plurality of products from the electronic computing device;
simultaneously customize the subset of the plurality of products in response to an input the electronic computing device by manipulating the common feature of the subset of the plurality of products;
store a group identifier with the customized subset of plurality of products, the group identifier identifying the customized subset of the plurality of products;
receiving customization limits defining types of customizations available to a second user for further customization of the customized subset of plurality of products;
receive additional selections from the electronic computing device to associate an individual identifier with the customized subset of plurality of products, wherein the individual identifier corresponds to an identity of the second user authorized to further customize the customized subset of the plurality of products, the second user different than the first user, and wherein the individual identifier is associated with the customization limits defining the types of customizations available to the second user;
transmit digital representations of the customized subset of the plurality of products for further customization by the second user operating a second electronic computing device communicating with an individual customization server; and
wherein the individual identifier associated with customized subset of the plurality of products enables further customizations to the customized subset of the plurality of products by the second user, the types of customizations available to the second user limited as defined by the customization limits associated with the individual identifier.

* * * * *